March 24, 1970 S. ANISKOVICZ 3,503,039

DEVICE FOR CHASING RATS

Filed Feb. 17, 1969 2 Sheets-Sheet 1

SEBASTIAN ANISKOVICZ
INVENTOR.
BY Leo C. Krazinski
ATTORNEY

March 24, 1970 S. ANISKOVICZ 3,503,039

DEVICE FOR CHASING RATS

Filed Feb. 17, 1969 2 Sheets-Sheet 2

SEBASTIAN ANISKOVICZ
INVENTOR.

BY Leo C. Krazinski
ATTORNEY

United States Patent Office 3,503,039

Patented Mar. 24, 1970

3,503,039

DEVICE FOR CHASING RATS

Sebastian Aniskovicz, Forked River, N.J., assignor, by mesne assignments, to Sonictron Corporation, East Rutherford, N.J., a corporation of Delaware Filed Feb. 17, 1969, Ser. No. 799,770
Int. Cl. A01m *29/00;* G10k *10/00*
U.S. Cl. 340—15 10 Claims

ABSTRACT OF THE DISCLOSURE

An electronic sound generator and amplifier having an electrical signal with waveform and modulation characteristics which signal when reproduced into sound at a low intensity is effective in causing rats to flee from the area of said reproduced signal. The waveform and modulation characteristics of the signal simulate the ultrasonic sounds made by an agitated rat. A feedback path is provided in the amplifier to maintain the sound level independent of the load imposed by different numbers of transducers.

BACKGROUND OF THE INVENTION

Field of the invention

The present invention relates to the removal of rats from a selected area by producing sound energy that simulates the sound made by frightened rats.

The prior art

Heretofore, electronic devices have been used for chasing many types of pests and rodents, such as mosquitoes, flies, birds, bugs, bats and mice, as exemplified by Patent No. 3,058,103. Such prior devices in attempting to be effective against so broad a category of pests do not provide optimal effectiveness in eradicating rats from a specified area.

SUMMARY OF THE INVENTION

Accordingly, an object of the present invention is to provide an electronic device capable of generating an electrical signal comprising a carrier frequency amplitude modulated by a pulsed lower frequency which signal is converted by a transducer to sound energy for chasing rats from an area covered by this sound energy.

Another object is to provide a solid state rat sound simulator adapted to maintain a preset output level of sound energy automatically regardless whether a single or a plurality of transducers are employed.

Still another object is to provide a solid state rat sound simulator having a frequency output which is effective in chasing rats but which is harmless to human beings.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are generally accomplished by providing an improved electronic rat repelling device which comprises an oscillator operating above human hearing range, the frequency of which is amplitude modulated by amplified signal of another lower frequency oscillator which is also above human hearing range. The frequency of the modulating oscillator is pulse modulated by a multivibrator. The modulated carrier frequency is then amplified by several stages of voltage amplifiers to produce an amplified carrier frequency which drives a power amplifier that is connected to a loud speaker type transducer capable of producing sound energy at a high frequency in the range of approximately 40,000 cycles per second. The modulated signal delivered by the transducer has characteristics similar to the sound produced by a frightened rat and because of this similarity to a natural rat sound it is effective for repelling rats from the vicinity of this sound even though the level is low, as the frequency chosen was in the optimal hearing range for rats. The output voltage which drives the transducer or transducers is sampled and used to control the gain of one of the voltage amplifier stages so that, if the output voltage tends to drop, the gain of the controlled stage increases and the output voltage returns to a preset value. Controls are provided to adjust the frequency of the oscillators, the percentage of modulation and the output level.

BRIEF DESCRIPTION OF THE DRAWINGS

A preferred embodiment of the invention has been chosen for purposes of illustration and description and is shown in the accompanying drawings, forming a part of the specification, wherein.

DESCRIPTION OF PREFERRED EMBODIMENT

The sound simulator of this invention has been designed specifically for causing rats to leave an area and has been found successful in removing rats from selected experimental areas where conventional electronic devices heretofore had failed.

It has been determined empirically in this invention that the tone or sound useful in chasing rats from an area can be classified into two categories. In the first category we have a high intensity sound that approaches the threshold of pain for the rat where neither the frequency nor the waveform is critical; and in the second category we have a relatively low intensity sound but with waveshape and modulation characteristics similar to those of the sound pulses produced by an actual rat when it is frightened or agitated. This invention is directed to the production of sound in the second category.

Experiments made on rats indicate that a rat becomes frightened and agitated by sounds similar to those made by another rat when the latter is frightened or agitated. For example, a number of wild rats (genus *Rattus rattus*) were caught and placed in large wire mesh enclosures. The sounds made by these rats when they were frightened or agitated were picked up by a high frequency condenser microphone, amplified and observed on as oscilloscope. An electronic sound simulator was then designed which closely duplicated the above rat sounds. When the sound from this electronic sound simulator was reproduced adjacent the rats, it was noted that the rats were visibly disturbed by it. It has been found that the sounds emitted by the rats in the above instance were similar to those described and illustrated in the Journal of Experimental Biology (1966) 45, 321–328, entitled Sound Production and Reception in a Cockroach by D. M. Guthrie, and in particular pages 326 and 327, FIGS. 6(c) and 6(d) thereof which illustrate recordings of sounds made by rats.

Since the peak of hearing for rats is at a frequency of about 40,000 cycles per second, such frequency does not have any effect on human beings.

Rats also make low frequency sounds having similar waveform and modulation characteristics but it was found that the above high frequency reproduced sound had the same disturbing effect upon them as the low frequency sound, but without affecting human beings.

It is not only difficult but also expensive to fill a large area with high intensity sound at high frequencies because of low transducer efficiencies and also because there is considerable sound absorbing material in areas from which the rats are to be chased. Accordingly, it is more economical and easier to cover a large rat infested area with the relatively low intensity sound produced in this invention. And it has been found that rats leave areas in which the sound produced by the simulator of this invention is audible to them.

Figure 1:
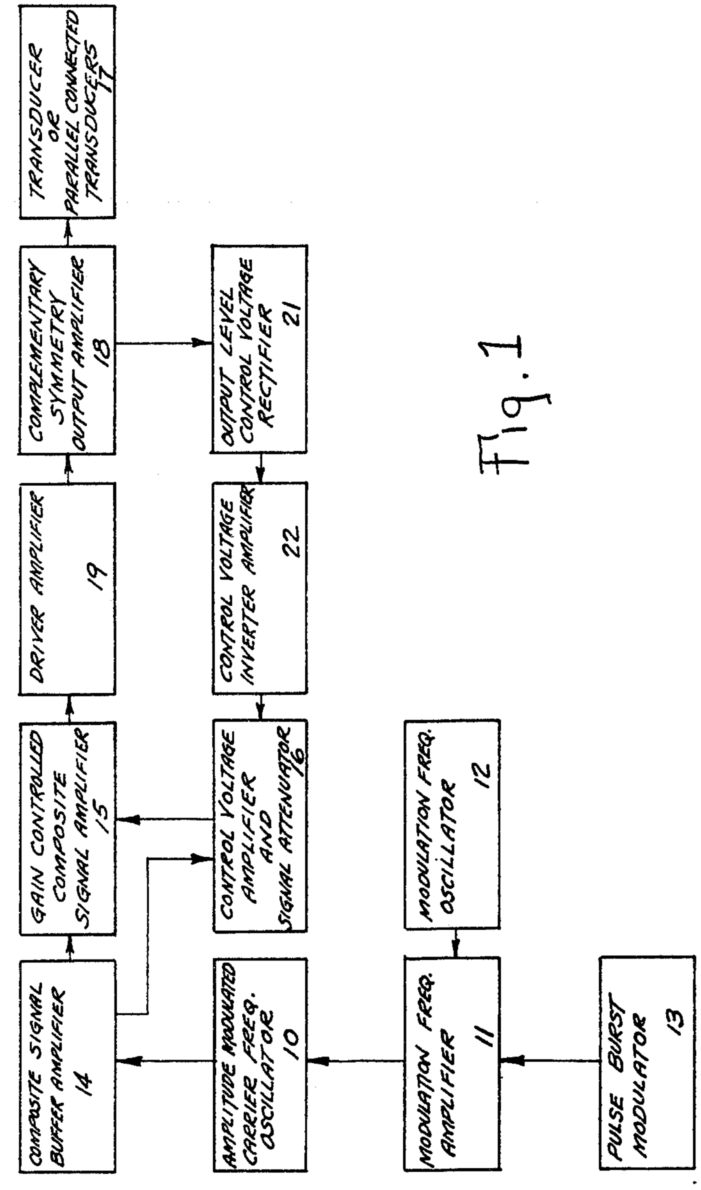
FIG. 1 is a block diagram illustrating an electronic rat sound simulator.

Referring now to the drawings, particularly to FIG. 1, there is shown in block formation an amplitude modulated carrier frequency oscillator 10, adapted to operate at a frequency of about 40,000 cycles per second as a source of energy, which frequency is amplitude modulated by a pulsed modulation frequency amplifier 11 having as an energy source a modulation frequency oscillator 12 operating at a frequency of about 20,000 cycles per second, and which amplifier 11 is pulse modulated by a pulse burst modulator 13.

The signal from the amplitude modulated carrier frequency oscillator 10 is connected to a composite signal buffer amplifier 14 where the signal is amplified to the proper level for driving a gain controlled composite signal amplifier 15. The composite signal comprises a carrier frequency amplitude modulated by a pulsed modulation frequency with a pulse duration of about 50 milliseconds and of about a 20 millisecond interval between pulses. The individual pulses that make up the pulse bursts in the train are about 50 microseconds wide. The output of the buffer amplifier 14 is connected both to the gain controlled composite signal amplifier 15 and to a control voltage amplifier and signal attenuator 16 where the signal amplitude is automatically adjusted to provide a preset voltage level at the output for either a single or plurality of transducers 17 connected to a complementary symmetry output amplifier 18. The signal from the gain controlled composite signal amplifier 15 is connected to a driver amplifier 19 where it is further amplified to a sufficient level for driving the complementary symmetry output amplifier 18 to produce the required output power for the transducers 17.

A portion of the same signal voltage which drives the transducers 17 is bypassed from the output amplifier 18 to an output level control voltage rectifier 21 where the signal is rectified, filtered, adjusted to the proper level and then connected to a control voltage inverter amplifier 22 where the signal is inverted in polarity 180 degrees. The inverted signal from amplifier 22 is connected to the control voltage amplifier and signal attenuator 16 where it is amplified to the proper level for controlling the gain controlled composite signal amplifier 15. The control voltage amplifier and signal attenuator 16 also serves the purpose of attenuating the signal voltage before it reaches the input of the gain controlled composite signal amplifier 15, the attenuation being proportioned to the control voltage. The automatically controlled output level feature has several advantages in that no heat is dissipated in load resistors which would normally be substituted for unused transducers. Also there is a reduction in the amount of heat generated by the driver amplifier 19 and output amplifier 18 stages when the maximum number of transducers are not utilized, as the power level is automatically reduced when fewer transducers 17 are connected to the amplifier 18.

Figure 2:
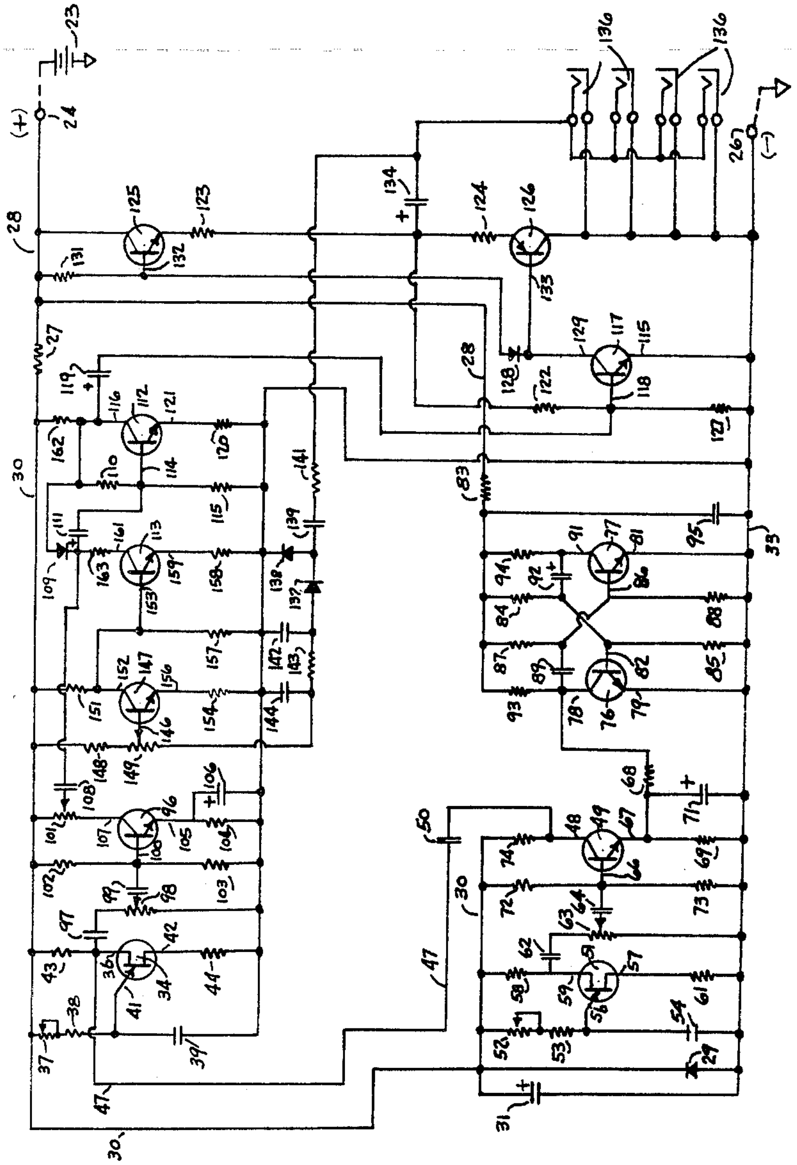
FIG. 2 is a schematic diagram of the electrical components constituting the block diagram of FIG. 1.

Referring now to the schematic diagram of FIG. 2, there is shown a direct current power supply 23 of suitable voltage and current, the positive potential being connected to terminal 24 and the negative (ground) potential to terminal 26. The voltage at terminal 24 is reduced to the required level by resistor 27 in lead 28 and held constant at that level by a Zener diode 29 in lead 30. Capacitor 31 in lead 30 filters the noise generated by Zener diode 29. All voltages supplied by voltage supply lead 30 are regulated by the Zener diode 29. It might be mentioned at this point that the oscillators and low level stages are supplied with regulated voltage to prevent drift and that all voltages are referenced to a ground lead 33 connected to terminal 26.

The amplitude modulated carrier frequency oscillator 10 (FIG. 1) includes in FIG. 2 an unijunction transistor 34 connected as a relaxation oscillator with provision for amplitude modulation at its base two element 36. This transistor 34 includes a frequency determining resistance-capacitance network comprising a potentiometer 37 for adjusting the frequency of oscillation, a fixed resistor 38 and a capacitor 39 connected in series with the potentiometer 37. Emitter element 41 of the unijunction transistor 34 is connected to resistor 38 at its junction with capacitor 39. At the start of the cycle the emitter element 41 is reverse biased and is accordingly in a non-conducting state. As the capacitor 39 is charged through potentiometer 37 and resistor 38, the voltage in emitter element 41 rises towards the supply voltage of lead 30, so that when this voltage reaches the peak point voltage, emitter element 41 becomes forward biased and the dynamic resistance between emitter element 41 and base one element 42 drops to a low value. Capacitor 39 then discharges through the emitter element 41. When the voltage at the emitter element 41 reaches a minimal value, the emitter element 41 ceases to conduct current and the cycle is then repeated. A resistor 43 is connected between base two element 36 of unijunction transistor 34 and power supply lead 30 as a load impedance while resistor 44 connected between base one element 42 of unijunction transistor 34 and ground lead 33 is used to bias the stage for proper operation. The signal at base element 36 of the unijunction transistor 34 is amplitude modulated by a lower frequency modulation voltage which is connected to base two element 36 of this stage by modulation voltage lead 47 which in turn is connected to collector element 48 of a modulation frequency amplifier transistor 49 through coupling capacitor 50.

The modulation frequency oscillator 12 (FIG. 1) includes in FIG. 2 an unijunction transistor 51 connected as a relaxation oscillator. The frequency determining resistance-capacitance network for this oscillator comprises a potentiometer 52 for adjusting the frequency of oscillation, a fixed resistor 53 and a capacitor 54 connected in series with the potentiometer 52. Emitter element 56 of the unijunction transistor 51 is connected to resistor 53 at its junction with capacitor 54. At the start of the cycle the emitter element 56 is reverse biased and is accordingly in a non-conducting state. As the capacitor 54 is charged through potentiometer 52 and resistor 53, the voltage in emitter element 56 rises towards the supply voltage of lead 30, so that when this voltage reaches the peak point voltage, emitter element 56 becomes forward biased and the dynamic resistance between emitter element 56 and base one element 57 drops to a low value. Capacitor 54 then discharges through the emitter element 56. When the voltage at this emitter element 56 reaches a minimal value, the emitter element 56 ceases to conduct current and the cycle is then repeated. A resistor 58 is connected between base two element 59 of unijunction transistor 51 and power lead 30 as a load impedance across which the signal voltage is developed. A resistor 61 connected between base one element 57 of unijunction transistor 51 and ground lead 33 is used to bias the stage for proper operation. The signal output of transistor 51 is fed through coupling capacitor 62, voltage level adjustment potentiometer 63 and coupling capacitor 64 to base element 66 of the modulation frequency amplifier transistor 49.

The modulation frequency amplifier 11 (FIG. 1) includes in FIG. 2 the transistor 49 connected as a pulse modulated amplifier. The stage is connected as a common emitter amplifier with pulse modulation introduced into the emitter element 67 of transistor 49 through a modulation signal coupling resistor 68. A resistor 69 connected between the emitter element 67 and ground lead 33 serves the functions of biasing the transistor 49 and as a voltage divider for the pulse modulation voltage. A capacitor 71 connected between the emitter element 67 of transistor 49 and ground lead 33 serves the functions of preventing audible clicks as a result of the pulse modulation and it also reduces the signal degeneration introduced into the stage by emitter resistor 69. Resistor 72 connected between the voltage supply line 30 and the base element 66 of transistor 49 and also connected in series with resistor 73 connected between the base element 66 of transistor 49 and ground lead 33 supplies forward bias for transistor 49. Resistor 74 connected between the voltage supply line 30 and collector element 48 of transistor 49 serves as a collector load impedance. The pulse modulated signal from transistor 49 is coupled to the amplitude modulated carrier frequency oscillator unijunction transistor 34 through capacitor 50 and lead 47.

The pulse burst modulator 13 (FIG. 1) included in FIG. 2 comprises a (free running) astable multivibrator including a pair of transistors 76 and 77. The pulse modulation voltage is a square wave at collector element 78 of transistor 76. The emitter elements 79 and 81 of transistors 76 and 77 respectively, are connected to ground lead 33. Bias voltage is supplied from the multivibrator voltage supply lead 80 to base element 82 of transistor 76 through resistor 84 which is also in series with resistor 85 connected from base element 82 to ground lead 33, and to base element 86 of transistor 77 through resistor 87 which resistor is also in series with resistor 88 connected from base element 86 of transistor 77 to ground lead 33. The collector element 78 of transistor 76 is connected to base element 86 of transistor 77 through capacitor 89 and the collector element 91 of transistor 77 is connected to base element 82 of transistor 76 through capacitor 92. Resistor 93 connected between multivibrator voltage supply lead 80 and collector element 78 of transistor 76 and resistor 94 connected between the multivibrator voltage supply lead 80 and collector element 91 of transistor 77 are the collector load resistors.

Resistor 83 in series with voltage supply lead 28 and capacitor 95 serve as a decoupling filter between the D.C. voltage supply lead 28 and the multivibrator voltage supply lead 80. The purpose of this filter is to prevent the multivibrator pulses from modulating the D.C. voltage supply lead 28 and appearing as an audible output from the transducer.

The signal from the amplitude modulated carrier frequency oscillator transistor 34 at base two element 36 is connected to the composite signal buffer amplifier transistor 96 through coupling capacitor 97, voltage level adjusting potentiometer 98 and coupling capacitor 99. Transistor 96 is included in the composite signal buffer amplifier 14 (FIG. 1) and the signal is fed to the base element 100 of this transistor 96 which is connected as a common emitter amplifier. Potentiometer 101 is used to set the level of the signal which is used to drive the succeeding amplifier stages. Resistors 102 and 103 comprise a bias voltage divider network for the base element 100. Resistor 104 connected between emitter element 105 and ground lead 33 further helps stabilize the stage. Capacitor 106 also connected between emitter element 105 and ground lead 33 is used to prevent degeneration of the signal. The signal from collector element 107 of transistor 96 is connected via potentiometer 101 and capacitor 108 to signal attenuator diode 109 and also via capacitor 111 to transistor 112 which is a component of gain controlled composite signal amplifier 15 (FIG. 1).

The amount of amplification that occurs in the gain controlled composite signal amplifier transistor 112 is controlled by the control voltage amplifier transistor 113. As transistor 113 conducts more heavily, the forward bias at base element 114 and the voltage at collector element 116 of transistor 112 is reduced thereby causing a reduction in amplification for transistor 112. Also, as transistor 113 conducts more heavily, diode 109 conducts more with a resultant drop in its impedance whereby a shunt is placed across the signal. The signal from collector element 116 of transistor 112 is coupled to the driver amplifier transistor 117 at base element 118 via coupling capacitor 119. Resistors 110 and 115 are the voltage divider to provide proper bias for base element 114 of transistor 112. Resistor 110 also supplies A.C. feed back from collector element 116 to base element 114 of transistor 112. The emitter bias resistor 120 connected from emitter element 121 to the ground lead 33 tends to stabilize the stage against temperature variations and also, since no bypass capacitor is used across this resistor 120, the desired low frequency attenuation is also obtained in this stage.

The driver amplifier 19 (FIG. 1) includes in FIG. 2 the above mentioned transistor 117 which is connected in the circuit as a common emitter amplifier. Forward bias is supplied to transistor 117 by resistor 122 which is connected between base 118 of transistor 117 and the junction of resistors 123 and 124. The bias for transistor 117 is controlled by the voltage drop across output transistors 125 and 126. A resistor 127 connected on one side to the base element 118 of transistor 117 and on its other side to ground lead 33 is part of a base bias voltage divider, being connected in series with the resistor 122 to form the base element bias voltage divider network. Diode 128 in series with collector element 129 of transistor 117 is mounted on the same heat sink as the output transistors 125 and 126 and provides temperature compensation for these output transistors 125 and 126. The idling current for the driver amplifier transistor 117 is established by resistor 131 and the signal from this transistor 117 is directly coupled to the base elements 132 and 133 of output transistors 125 and 126, respectively.

The complementary-symmetry output amplifier 18 (FIG. 1) includes in FIG. 2 the hereinbefore mentioned transistors 125 and 126, the former being an NPN transistor and the latter a PNP transistor, both transistors being connected in a Class B push-pull complementary symmetry configuration. The use of this type of circuitry eliminates the need to use transformers which present problems at high frequency operation. The elimination of transformers in the output amplifier also reduces the weight and cost of this equipment substantially. The idling current in each of the transistors 125 and 126 is established by the resistors 123 and 124 in the respective emitter circuits. The D.C. voltage drop across the bias diode 128 is essentially independent of changes in the current through this diode since it has a low dynamic impedance. This voltage across the diode 128 decreases with increases in temperature and partially compensates for changes in the base-to-emitter voltage of the output transistors 125 and 126. The signal from the output transistors 125 and 126 is coupled to a transducer 17 (FIG. 1), or a plurality of transducers 17 connected in parallel, through coupling capacitor 134. The transducer 17 or transducers are connected by plugging into output jacks 136, all connected in parallel. The voltage available across the transducers 17, that is, at the jacks 136 is also used to maintain a constant output level for a single to a plurality of transducers 17.

The output level control voltage rectifier 21 (FIG. 1) includes in FIG. 2 voltage doubler rectifier diodes 137 and 138 in series with a capacitor 139. The output voltage available at the jacks 136 and, in turn, at the transducers 17, is connected to the capacitor 139 through resistor 141. Resistor 141 is used as a decoupling resistor to prevent distortion of the output signal by providing isolation. Capacitor 142 serves to filter the rectifier control voltage. Resistor 143 and capacitor 144 provide the required delay time constant and also help to further filter the control voltage which is connected to the base element 146 of the control voltage inverter amplifier transistor 147.

The control voltage inverter amplifier 22 (FIG. 1) includes in FIG. 2 the above mentioned transistor 147 connected as a common emitter voltage amplifier. Since the control voltage is of negative polarity, resistor 148 connected to the regulated D.C. voltage supply lead 30 is required to establish proper bias at the base element 146 of transistor 147. Potentiometer 149 is used to adjust the control voltage to the level required for proper operation of gain controlled composite signal amplifier transistor 113 and signal attenuator diode 109. Resistor 151 connected between the regulated D.C. voltage supply lead 30 and collector element 152 of transistor 147 serves as a load resistor. The D.C. control voltage is developed across this resistor 151 and is directly connected to base element 153 of control voltage amplifier transistor 113. Resistor 154 connected between emitter element 156 of transistor 147 and ground lead 33 helps provide stable operation of this stage. This stage is required to invert the D.C. control voltage so that the gain of the gain controlled voltage amplifier transistor 112 decreases as the signal voltage at the output of the complementary symmetry output amplifier 18 (FIG. 1) increases. Also, as the signal voltage at the output of this amplifier 18 decreases, the gain of the transistor 112 increases as a result of the change in control voltage.

The impedance of diode 109 changes with the current flowing through it. The current flow through this diode is also controlled by the control voltage. As the signal voltage increases across the output of the complementary symmetry output amplifier 18 (FIG. 1), a larger current flows through diode 109 which causes the diode to attenuate the signal to a greater degree. As the signal across this amplifier 18 decreases, a smaller current flows through diode 109 with lessened attenuation of the signal by the diode.

The control voltage amplifier and signal attenuator 16 (FIG. 1) includes in FIG. 2 the transistor 113, which is connected as a common emitter D.C. voltage amplifier, and also the diode 109, the function of which is described in the preceding paragraph. The D.C. control voltage from the collector element 152 of transistor 147 is directly connected to the base element 153 of control voltage amplifier transistor 113. Resistor 157 connected between base element 153 and ground lead 33 serves as a voltage divider to maintain the proper signal level and bias for transistor 113. Emitter stabilization and bias of transistor 113 are provided by resistor 158 connected between emitter element 159 and ground lead 33. Collector element 161 of transistor 113 is supplied with voltage through a series combination of resistor 162, diode 109 and resistor 163. Since diode 109 is effectively in series and between collector element 161 and supply voltage lead 30 for transistor 113, the current flowing through diode 109 is proportional to the conduction through transistor 113. The conduction of current through transistor 113 increases with an increase in signal voltage at the output of the complementary symmetry output amplifier 18 (FIG. 1).

What is claimed is:

1. Apparatus comprising a waveform generator for electronically producing a signal which simulates sound made by an agitated rat, and amplifier connected to the output of the waveform generator, gain control circuitry for maintaining in said amplifier a constant output level which is automatically adjusted to a preset output voltage for variable loads, and at least one transducer connected to the output of said amplifier for changing said signal to sound pressure at a frequency above human hearing range.

2. Apparatus according to claim 1, wherein the signal produced by said waveform generator constitutes a frequency that is amplitude modulated by a lower pulse modulated frequency.

3. Apparatus according to claim 1, wherein said variable loads across the output of the amplifier are constituted by transducers so that the loads are changed from a high impedance to a low impedance or conversely from a low impedance to a high impedance according to the number of said transducers connected to said amplifier output.

4. Apparatus according to claim 1, wherein said gain control circuitry includes a diode and said amplifier output voltage is sampled, rectified to provide a control voltage of the proper polarity, inverted, amplified and used to bias said diode as a signal attenuator, so that the impedance of the diode decreases as the level of the control voltage increases and so that the impedance of the diode increases as the control voltage decreases.

5. Apparatus according to claim 1, wherein said waveform generator includes two oscillators having signals of different frequencies, a modulation frequency amplifier for amplifying said signal of one of said oscillators, a pulse modulator including a multivibrator for modulating said amplified signal of said one oscillator, and said signal of the other of said oscillators being amplitude modulated by said amplified, pulse modulated signal of said one oscillator.

6. Apparatus according to claim 5, wherein said waveform generator includes means for eliminating audible clicks in said transducer.

7. Apparatus according to claim 6, wherein said click eliminating means comprise a capacitor include in said modulation frequency amplifier.

8. An electronic rat repelling device comprising, in combination, means for producing a first carrier frequency above human hearing range; means for producing a second carrier frequency at a different frequency from said first carrier frequency; means for pulse modulating said second carrier frequency to provide a pulse modulated carrier frequency; means for modulating said first carrier frequency with said pulse modulated carrier frequency; means for amplifying said preceding modulated carrier frequency; power amplification means driven by said amplified modulated carrier frequency, and transducer means connected to said power amplification means for producing sound at a frequency above human hearing range which sound has characteristics similar to sound produced by a frightened rat.

9. An electronic rat repelling device in accordance with claim 8, wherein said first means includes an oscillator producing a carrier frequency of about forty thousand cycles per second and said second means includes an oscillator producing a carrier frequency of about twenty thousand cycles per second.

10. An electronic rat repelling device in accordance with claim 9, wherein said means for pulse modulating said second carrier frequency is a multivibrator.

References Cited

UNITED STATES PATENTS 2,922,999 1/1960 Carlin ............... 340—15

RICHARD A. FARLEY, Primary Examiner

D. C. KAUFMAN, Assistant Examiner

U.S. Cl. X.R.

43—124; 181—.5